G. D. BAILEY.
DIFFERENTIAL RELEASING CLUTCH.
APPLICATION FILED APR. 28, 1917. RENEWED DEC. 14, 1918.
1,313,247.
Patented Aug. 19, 1919.
3 SHEETS—SHEET 1.
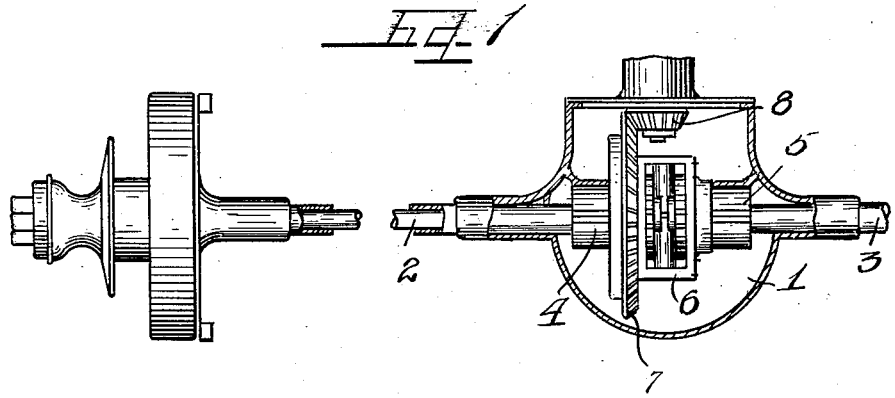
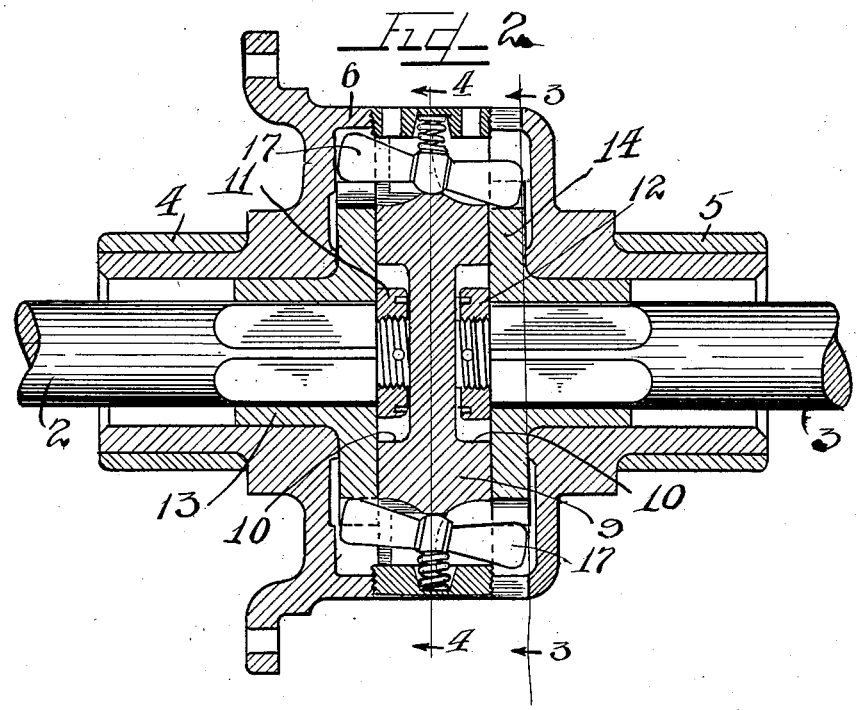

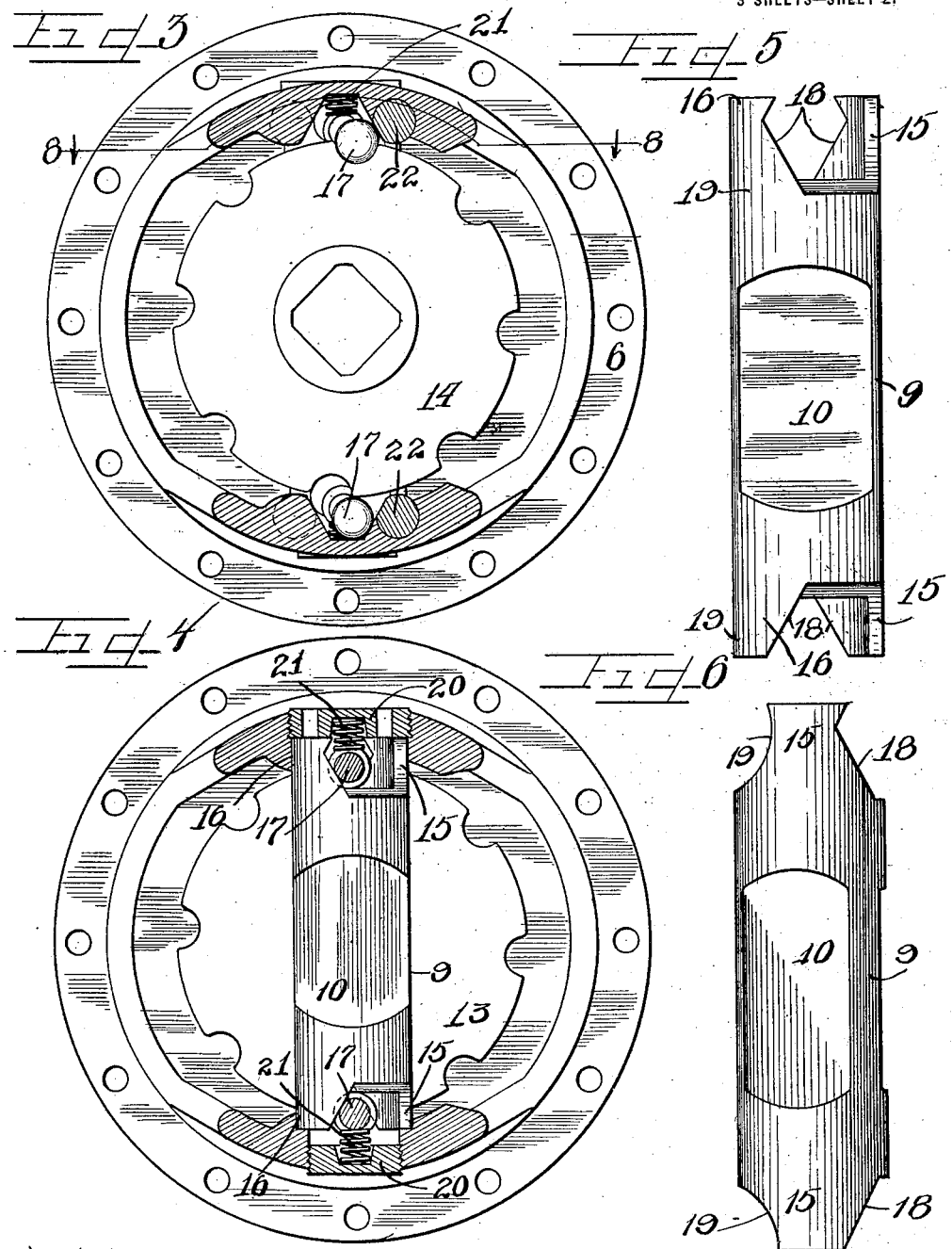

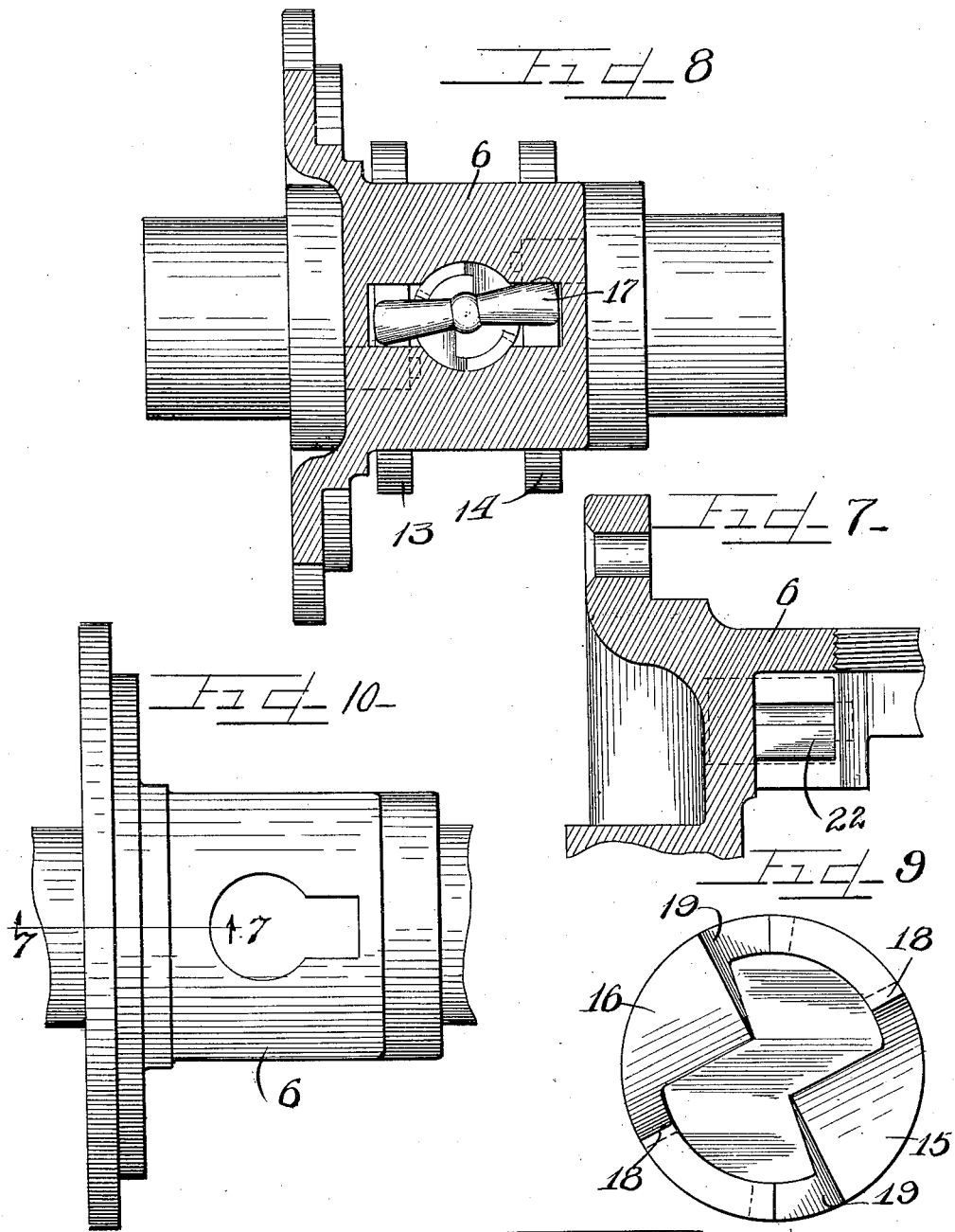

UNITED STATES PATENT OFFICE.

GEORGE D. BAILEY, OF CHICAGO, ILLINOIS, ASSIGNOR TO BAILEY NON-STALL DIFFERENTIAL CORPORATION, OF CHICAGO, ILLINOIS, A CORPORATION OF NEW YORK.

DIFFERENTIAL RELEASING-CLUTCH.

1,313,247.      Specification of Letters Patent.      Patented Aug. 19, 1919.

Application filed April 28, 1917, Serial No. 165,243. Renewed December 14, 1918. Serial No. 266,811.

*To all whom it may concern:*

Be it known that I, GEORGE D. BAILEY, a citizen of the United States, and a resident of the city of Chicago, in the county of Cook and State of Illinois, have invented certain new and useful Improvements in Differential Releasing-Clutches; and I do hereby declare that the following is a full, clear, and exact description of the same, reference being had to the accompanying drawings, and to the numerals of reference marked thereon, which form a part of this specification.

This invention relates to an improved form of differential releasing clutch adapted to supplant the usual differential gear used in the rear axle drive of motor cars, and one in which the construction has been greatly simplified and the parts reduced in number, greatly facilitating manufacture of the device, as well as assembly and installation of the same.

It is an object therefore of this invention to construct a device wherein an integral or unitary gear frame is provided adapted to receive a support therein for tilting levers or pawls which co-act with ratchet wheels journaled within said frame and into which are secured the squared ends of the live axle sections.

It is also an object of this invention to construct a releasing clutch mechanism adapted for use where a differential drive is desired, wherein the parts operate to transmit a drive to that one of the two elements in the mechanism to which the greatest resistance to drive is offered, however driving said elements equally when the driving resistance to both is equal and permitting a coasting effect of both the elements or a differential coasting effect therebetween to take place when conditions so obtain.

It is furthermore an important object of this invention to provide a releasing clutch mechanism capable of differential action wherein a gear cage member or frame has removably inserted therewithin a hardened metal insert cylinder affording a seat for tilting ratchet levers for co-action with ratchet wheels rotatably mounted within said cage and with means provided for permitting easy removal of said tilting ratchet levers.

It is finally an object of this invention to construct an improved type of differential releasing clutch mechanism consisting of few parts simple in construction readily assembled and dismantled.

The invention (in a preferred form) is illustrated in the drawings and hereinafter more fully described.

In the drawings:

Figure 1 is a fragmentary view partly broken away of a rear axle equipped with a differential releasing clutch mechanism embodying the principles of my invention.

Fig. 2 is an enlarged central section taken through the differential releasing clutch mechanism, with parts shown in elevation.

Fig. 3 is a fragmentary detail section taken on line 3—3 of Fig. 2, with parts in elevation.

Fig. 4 is a detail section taken on line 4—4 of Fig. 2, with parts in elevation.

Fig. 5 is an elevational view of the insert cylinder of the rear cage of the device.

Fig. 6 is another view thereof.

Fig. 7 is a fragmentary detail section taken at the upper end of the gear cage on the line 7—7 of Fig. 10.

Fig. 8 is a detail section taken on line 8—8 of Fig. 3.

Fig. 9 is a top plan view of the insert cylinder shown in Figs. 5 and 6.

Fig. 10 is a fragmentary top plan view of the device.

As shown in the drawings:

The reference numeral 1, indicates as a whole a pressed steel axle housing, in which are journaled the respective live driving axle sections 2 and 3. Said axle housing 1, is also provided with bearings 4 and 5, respectively, in which the extended hub ends of a gear cage, denoted as a whole by the reference numeral 6, are journaled. Bolted or otherwise secured in any suitable manner to the cage 6, is a large driving bevel gear 7, adapted to be driven by a bevel pinion 8, mounted within the axle housing and driven in any suitable manner by the drive shaft of the motor car. Inserted through registering apertures provided in the upper and lower ends of said cage 6, is a cylinder insert denoted as a whole by the reference numeral 9, recessed on opposite sides, as denoted by the reference numeral 10, to afford a space for lock nuts 11 and 12, respectively, secured upon the inner reduced ends of the axle sections 2 and 3. The opposite ends of said insert cylinder 9, are identical in construction, with the exception that the recesses, cam faces, and other parts thereof hereinafter described, are faced in opposite directions.

Journaled within the cage 6, and secured upon the inner squared ends of the respective axle sections 2 and 3, are ratchet wheels, denoted respectively by the reference numerals 13 and 14. Each of the ends of the insert cylinder 9, is provided with a pair of abutment walls 15 and 16, respectively, with a recess therebetween within which is mounted a tilting lever or pawl, denoted as a whole by the reference numeral 17. One edge of each of the abutment walls 15 and 16, is provided with an acute angled edge or surface 18, and the other edge of each of said abutment walls is concavely rounded and is denoted by the reference numeral 19. The insert cylinder 9, and its tilting lever pawls or ratchets 17, are held assembled within the cage 6, by plugs 20, threaded into the circular portion of key hole shaped apertures within said cage 6, as shown in Fig. 10, and each of said plugs is interiorly recessed to afford a seat for coiled compression springs 21, one of each of which bears upon the central portion of a tilting pawl 17, to hold the same seated against the end of the cylinder insert 9.

As clearly shown in Figs. 7 and 8, hardened cylindrical pins 22, are disposed within recesses in the cage 6, each one affording an abutment against which one end of a driving ratchet or pawl 17, bears when the other end thereof is interlocked with a ratchet wheel to drive the same, and each of said pins has one surface thereof flattened at the point at which the end of a tilting pawl contacts therewith. Said cage 6, at one side thereof opposite the recesses in the ends of the insert cylinder 9, is provided with apertures in which are threaded removable plugs (not shown), which, when removed, afford a means for inserting or removing one of the tilting ratchet pawls 17.

The operation is as follows:

Under normal operating conditions when the axle sections 2 and 3, revolve at the same rate of speed, one of the pawls 17, drives the right hand ratchet wheel 14, and the other pawl, the left hand ratchet wheel 13. The drive to the ratchet wheels is effected by a wedging of the end of a pawl into one of the recesses of the ratchet wheel by the driving cage 6, the end of the pawl, when in driving position, bearing against the hardened cylindrical insert seat 22, of the cage. Due to the tilting action of the pawls 17, it is possible for only one end of either of the pawls to be in driving engagement at any one time, but said pawls are each adapted to drive both of the ratchet wheels, that is one end of one of the pawls is adapted to drive one ratchet wheel in one direction and the other end thereof is adapted to drive the other ratchet wheel in an opposite direction. Inasmuch as the hardened cylindrical members 22, in the driving cage for each of the pawls are disposed on opposite sides of the pawls, it is evident that when one cylindrical member 22, impels one end of a pawl downwardly into engagement with its respective ratchet wheel, that the opposite end of the pawl must necessarily be elevated out of driving relation with the other ratchet wheel. Such movement of the pawl is assured by the acute angled abutment edge 18, of the abutment wall provided on the end of the insert cylinder 9. With the position of the parts illustrated in Figs. 2, 3, and 8, the right hand end of the upper pawl and the left hand end of the lower pawl are in driving engagement with the respective ratchet wheels to drive both of the axle sections forwardly. The right hand end of the lower pawl 17, as clearly shown in Fig. 2, is out of driving engagement with the ratchet wheel 14. However, in the event of the drive of the motor car being reversed by properly shifting the transmission gears, the respective acute angled abutment walls 18, formed on the ends of the insert cylinder 9, will cause the pawls to tilt oppositely from the position shown in Fig. 2, so that the left hand end of the upper pawl will engage the ratchet wheel 13, and the right hand end of the lower pawl will engage the ratchet wheel 14, in a position to transmit a reverse drive.

Assuming the pawls to be in the position shown in Fig. 2, with the respective ratchet wheels 13 and 14, driven forwardly, and that the wheel 14, is caused to rotate faster than its driving cage 6, and pawl 17, shown uppermost, due to the vehicle rounding a corner or some other cause, then the right hand end of the pawl shown uppermost, upon striking the opposite wall of its recess, i. e., the acute angled wall 18, on the upper end of the insert cylinder 9, will be elevated out of engagement with the ratchet wheel 14, and lifted up from its seat on the insert cylinder 9, against the compression of its spring. Thus both of the ends of the pawl 17, will be out of engagement with the ratchet wheels, the right hand end, however, clicking over the recesses in the ratchet wheel 14, until the speed of rotation of the ratchet wheel again equals that of the driving cage. Of course, in the event that both of the ratchet wheels 13 and 14, tend to rotate faster than the driving cage 6, the ends of the pawls will be elevated out of engagement with their respective ratchet wheels, so that both the pawls are entirely out of engagement with the ratchet wheels held upwardly on the acute angled walls 18, against the compression of their retaining springs 21. Due to the fact that each pawl performs two functions, that is, to drive one ratchet wheel in one direction by tilting one way, and to drive the other ratchet wheel in the other direction when tilted the other way, it is obvious that the pawl interlocking mechanisms between the associated driving elements and the ratchet wheels cannot possibly become accidentally engaged to lock and cause a reverse drive for one of the ratchet wheels during a forward rotation of the parts, except in the instance described in the foregoing, wherein the rear wheels of the vehicle serve to drive the driving mechanisms when the vehicle is coasting.

I am aware that various details of construction may be varied through a wide range without departing from the principles of this invention, and I therefore do not purpose limiting the patent granted otherwise than necessitated by the prior art.

I claim as my invention:

1. In a device of the class described, the combination with axle sections, of ratchet wheels secured thereon, an integral driving cage within which said ratchet wheels are journaled, a cylinder within said cage, tilting pawls therein extending transversely of said driving cage into recesses of said ratchet wheels to be wedged by the cage into driving engagement therewith to drive the ratchet wheels, and means driving said driving cage.

2. In a device of the class described, the combination with axle sections, of ratchet wheels secured thereon, a driving cage in which said ratchet wheels are journaled, an insert cylinder mounted rigidly within said driving cage, tilting pawls disposed on the ends of said insert cylinder, and hardened cylindrical inserts in said cage against which the ends of the pawls bear and are wedged into driving engagement with the ratchet wheels.

3. In a device of the class described, the combination with axle sections of a driving axle, ratchet wheels secured on said respective sections, a driving cage in which said ratchet wheels and axle sections are journaled, a driving gear secured on said cage, an insert cylinder in said cage having recesses in the ends thereof, tilting pawls mounted in the recesses in the ends of said insert cylinder, and hardened steel members mounted in said cage adapted to co-act with the ends of said tilting pawls to wedge the same into driving engagement with the ratchet wheels to transfer a drive from the cage to the ratchet wheels.

4. In a device of the class described, the combination with ratchet wheels, of tilting pawls mounted transversely of said ratchet wheels, a cage in which said ratchet wheels are journaled, a member inserted through said cage having recesses in the ends thereof affording a retaining means for said pawls, each pawl adapted at one of its ends to engage with one of said ratchet wheels and at its other end to engage with the other of said ratchet wheels, and means mounted in said cage for wedgingly thrusting the ends of said pawls into driving engagement with said ratchet wheels.

5. In a device of the class described, the combination with ratchet wheels, of a driving cage in which said ratchet wheels are journaled, tilting pawls mounted within said cage for transmitting a drive from the cage to the ratchet wheels, cylindrical means projecting through said cage for retaining said pawls in position, and pins mounted in said cage adapted to wedgingly move the ends of said pawls into engagement with the ratchet wheels.

6. In a device of the class described, a cage, an insert member therein, tilting pawls mounted in the ends of said insert member, resilient means retaining said pawls in proper position in the ends of said insert member, ratchet wheels journaled in said cage, and means in said cage to wedge the ends of said pawls into engagement with the ratchet wheels to drive the same by said cage.

7. In a device of the class described, the combination with ratchet wheels, of a driving cage in which said ratchet wheels are journaled, recessed cylindrical insert means projecting diametrically through said cage, and pawls seated therein and projecting therefrom to afford a means for transmitting a drive from the cage to said ratchet wheels.

8. In a device of the class described the combination of ratchet wheels, of a one piece driving cage in which said ratchet wheels are journaled, and means within said cage for transmitting a drive from the cage to said ratchet wheels.

9. In a device of the class described the combination with axle sections, of ratchet wheels secured thereon, of a one piece driving cage in which said ratchet wheels are journaled, pawls and pawl carrying means within said cage for transmitting a drive from said cage to said ratchet wheels and said axle sections.

10. In a device of the class described the combination with an integral one piece driving cage, of mechanisms journaled therein, and insert means diametrically engaged in said cage for effecting a drive from said cage to be transmitted to said mechanisms.

11. In a device of the class described the combination with axle sections, of ratchet members secured thereon, a driving cage within which said ratchet members are journaled, recessed insert means diametrically disposed within said cage, tilting pawls seated within said insert means and extending transversely of said driving cage into recesses of said ratchet members to be wedged by the driving cage into driving engagement therewith to drive the ratchet members and means for driving said driving said driving cage.

In testimony whereof I have hereunto subscribed my name in the presence of two subscribing witnesses.

GEORGE D. BAILEY.

Witnesses:
CHARLES W. HILLS, Jr.,
EARL M. HARDINE.

Copies of this patent may be obtained for five cents each, by addressing the "Commissioner of Patents, Washington, D. C."